Figure 1:
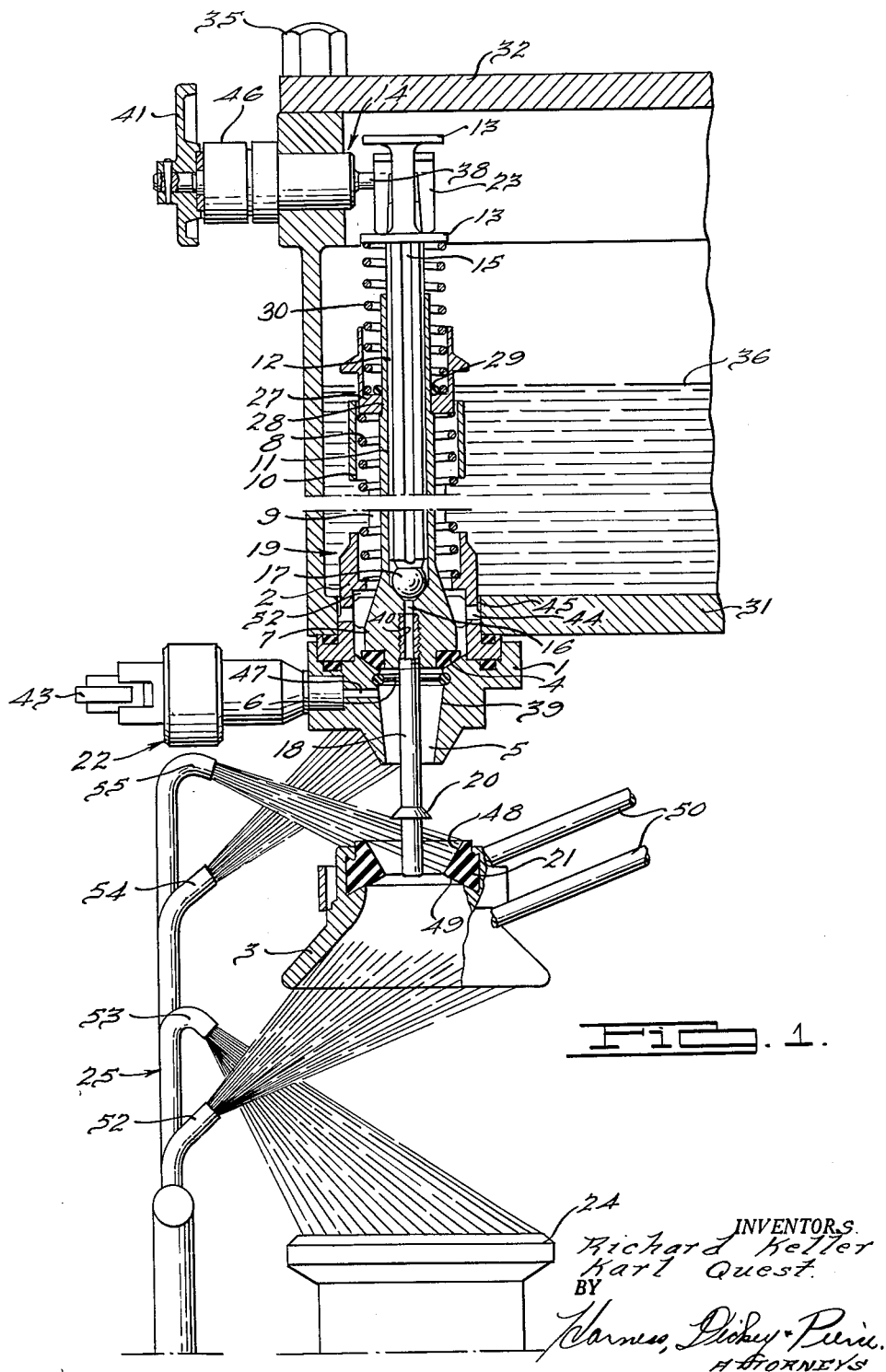

INVENTORS
Richard Keller
Karl Quest
BY
Harness, Dickey & Pierce
ATTORNEYS 2,973,267

METHOD AND DEVICE FOR STERILE RACKING HOT BEVERAGES CONTAINING CARBON DIOXIDE, ESPECIALLY BEER

Richard Keller, Dortmund-Aplerbeck, and Karl Quest, Dortmund-Korne, Germany, assignors to Dr. Bruno Kaiser, Hamburg, and Dr. Emil Pauls, Hamburg-Eidelstedt, Germany Filed Nov. 13, 1958, Ser. No. 773,684

Claims priority, application Germany Nov. 14, 1957

5 Claims. (Cl. 99—49)

The invention is concerned with a procedure for sterile racking of carbon dioxide containing beverages, especially beer, in which the beverage for pasteurizing and sterilizing purposes is heated to the required temperature and is then while hot immediately filled into sterilized transport containers or small containers (bottles, cans) destined for immediate consumption, and in which the liquid is kept under a certain pressure while the heating is effected in a continuous heater and while the filling is carried out by means of a counter pressure filler, this pressure being in excess of the carbon dioxide saturating pressure valid for the filling temperature or being not essentially below this pressure.

It is known that at the saturating point a certain pressure and a certain temperature correspond to the carbon dioxide content of the beverage and especially of the beer. For the carbon dioxide content of the beverage and especially of the beer at saturation the gas pressure is the higher, the higher the temperature of the beverage. At a certain carbon dioxide content in the saturated state therefore also the corresponding gas pressure rises with the temperature. The advantages of a hot racking of the beer immediately after heating the beer in a continuous heater for the purpose of pasteurizing or sterilizing are vital, especially since the danger of a later infection of the beer is eliminated in such a procedure, and the savings that might be made in the investment costs are considerable. On the other hand, however, in the case of such a hot racking the danger is involved that the carbon dioxide contained in the beverage may suddenly become free and that the beer may spray out of the can or bottle.

It is the object of the invention to decrease these dangers and to make the procedure of the hot racking as safe and simple in operation as possible.

According to the invention, after racking the beverage the gas space in the container is connected to the atmosphere and remains relieved in this way until the container is removed from the filling valve, whereupon the upper part of the flared centering mouth piece and the parts of the filling valve pointed towards it are sprayed with hot water before coming into touch with a new bottle or can.

The relief of the pressure within the neck of the container while the filling valve is pressed against the bottle mouth makes the formation of froth in the beverage difficult to a considerable degree which effect may be intensified by a gradual relief. In order to avoid a pressure increase in the container neck when carbon dioxide is freed in the beverage it is of advantage to keep the relief device open long enough to allow for a removal of the container from the filling valve.

In a further development of the invention it is proposed to let the fluid to be racked flow out of the filling valve into the container to be filled without the aid of a filling tube thereby leading the liquid through a screen or the like lying closely underneath the orifice of the container to the container wall, and to remove the remaining liquid from the gas tube of the filling valve after removal of the container, before the filling valve is sprayed with hot water.

When hot racking carbon dioxide containing beverages it is of advantage if the filling tube does not have to be taken out of the liquid after delivering the liquid into the container. A stirring of the liquid may result from this movement which leads to a release of carbon dioxide. At high temperatures of the liquid this free carbon dioxide may lead to an expulsion of the whole liquid. To prevent the liquid from descending freely out of the filling valve onto the bottom of the container or on the liquid already filled into the container, the liquid is passed through a screen to the container wall thus ensuring a smooth filling without carbon dioxide being freed.

During the racking procedure the liquid in the gas-tube rises to the height of the liquid level in the boiler of the counter pressure filler. If the liquid remainder is blown into a new bottle prior to filling with the liquid, then froth particles will form here which will lead to a freeing of carbon dioxide in the entering hot liquid and may result in a frothing over. For this reason it is proposed to spray liquid remainders staying in the gas-tube into the open after racking and removing of the filled bottle. After this, there may still be froth remainders at the flared mouth piece and the gas tube of the filling valve. In order to prevent these from influencing the liquid racked into the next bottle, the filling valve is to be sprayed with hot water prior to placing a new bottle into racking position.

With all filling procedures, the danger is involved that bottles of inferior quality may burst. Thus glass pieces may be deposited on the filling valve. But if the filling operation has been started, froth particles will also be present at the filling valve. To prevent them from entering into the next bottle it is advisable to rinse the empty filling valves first with large quantities of water. It is advisable to warm this water so as to prevent a cooling of the filling valve and with it a cooling of the liquid to be hot filled and an infection of same.

The invention is illustrated and explained in the accompanying drawings, in which Fig. 1 shows a section of a filling valve carrying out the procedure according to the invention.

In Figs. 2 to 9 the same valve is schematically shown in various working positions, i.e.

Figure 2:
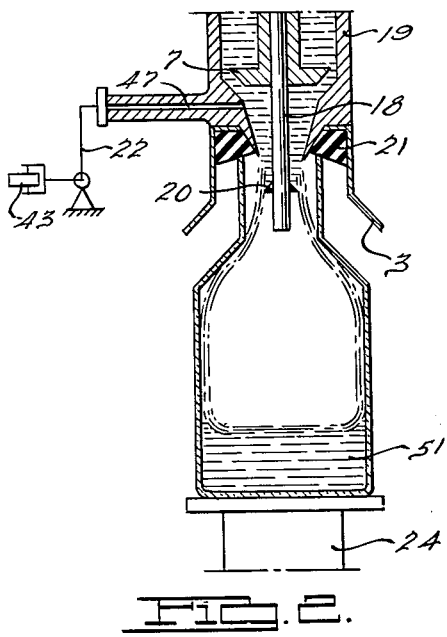
Figure 3:
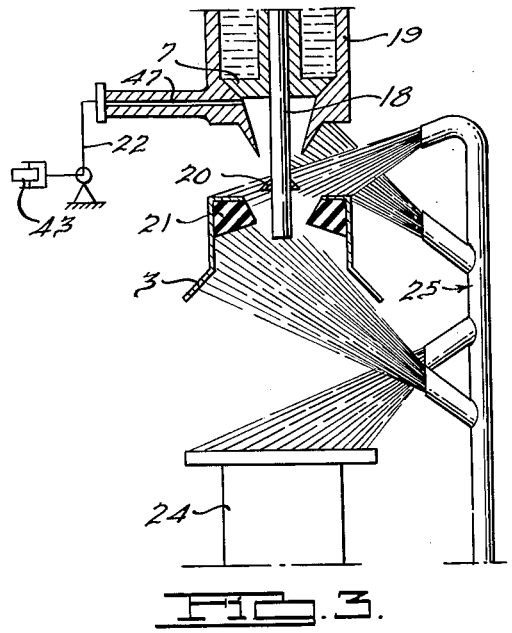
Figure 4:
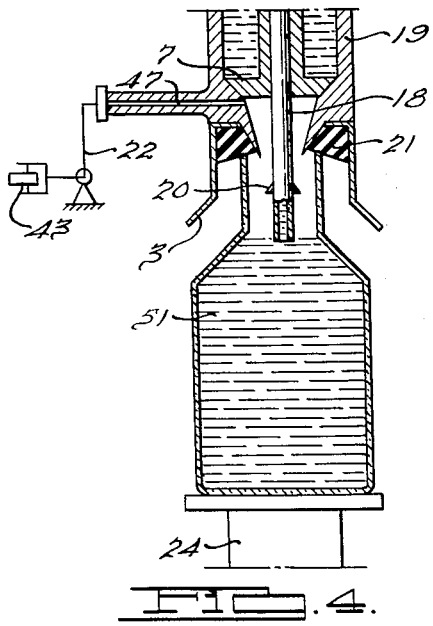
Figure 5:
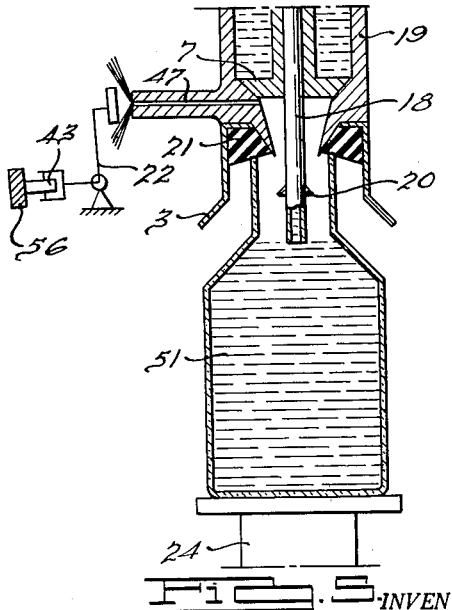
Figure 6:
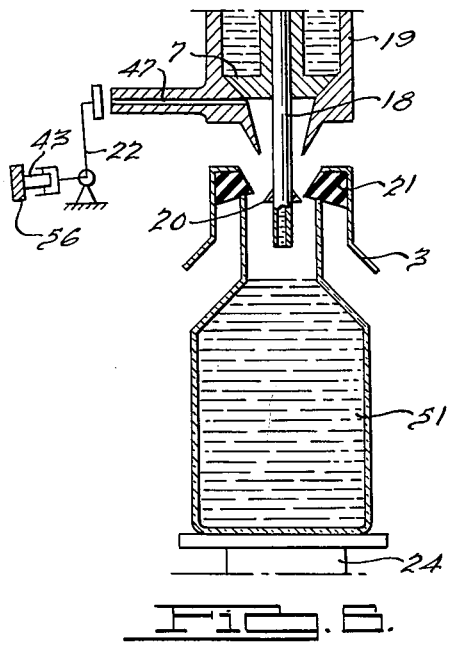
Figure 7:
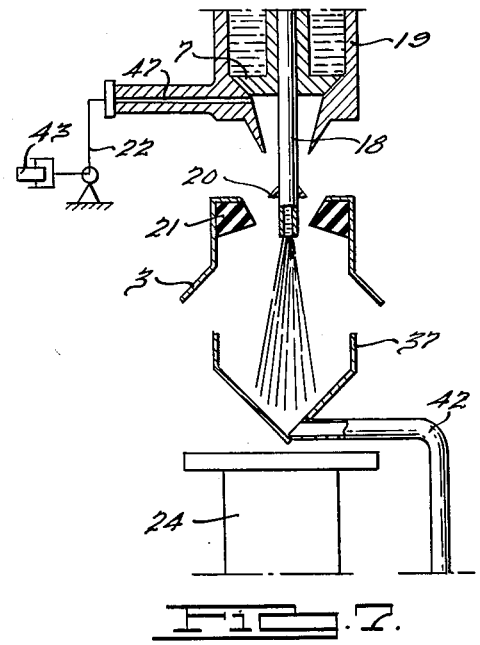
Figure 8:
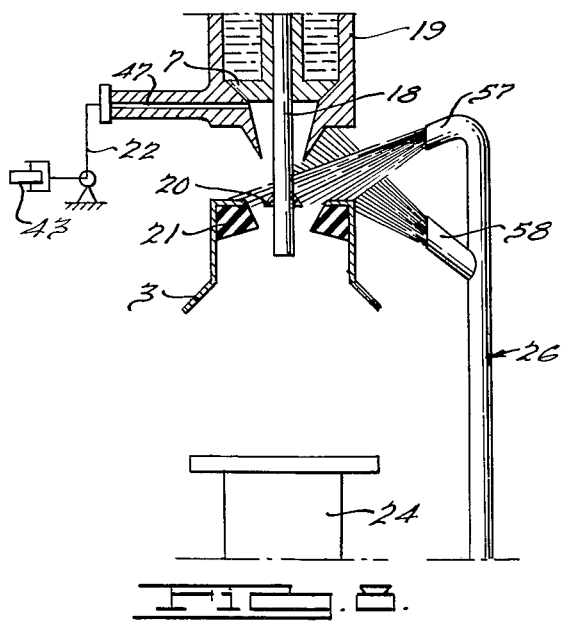
Figure 9:
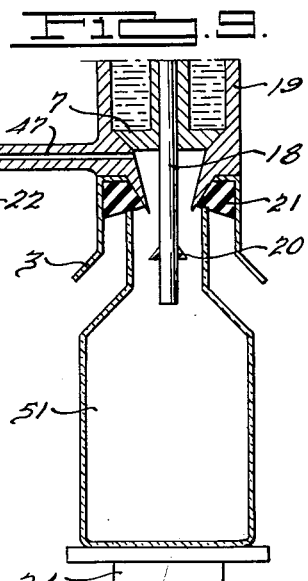

Fig. 2 shows a filling valve with a bottle pressed against it during the filling operation, Fig. 3 shows an empty filling valve being rinsed, the bottle having burst, Fig. 4 shows a filling valve with filled bottle, Fig. 5 shows a filling valve with bottle pressed closely to it, the relief valve being open, Fig. 6 shows a filling valve after filling a bottle with relief device open, Fig. 7 shows a filling valve during removal of fluid from the gas-tube, Fig. 8 shows a filling valve during rinsing of the flared centering mouth piece and the gas tube, and Fig. 9 shows a filling valve with a newly attached empty bottle.

As to be seen from Fig. 1 the filling tap generally designated at 19 consists of a valve housing 1 with the valve head-piece 2 and the flared centering mouth piece 3. In a way described later on in detail this filling valve is mounted in a supply vessel, the bottom being designated 31 and the cover being designated 32.

Within the valve housing 1 there is arranged the valve seat 4 with the liquid outlet 5 which is screened by a wire braid 6 and is formed like a cone converging downwardly as shown at 39. Within the valve head-piece 2 provided with ports 52 there is arranged a valve cone 7, which in its opening direction is loaded by a spring 8. The valve head piece 2 is provided with a bridge member 9 carrying a sleeve 10, in which a tubular extension 11 of the valve cone 7 of the liquid valve is guided. In this extension 11 of the valve cone 7 a rod 12 is arranged for actuating the gas valve 17. On the tubular extension 11 a flange 27 is fastened, against which the one end of the spring 8 abuts, the other end of said spring being supported by the valve head-piece 2. In the illustrated embodiment the flange 27 at its one side is supported on a shoulder 28 of the tubular extension 11; the other side of said flange supports a rubber ring 29 being positioned in a corresponding annular groove of the tubular extension 11.

The rod 12 with its upper end projects beyond the tube 11 of the liquid valve cone 7 and carries two disks 13 arranged one above the other such as to be engaged by a bifurcated lever 23 of the control device 14 of the filling valve. Between the flange 27 and the lower disk 13 a spring 30 is provided. The rod 12 of the gas valve is provided with grooves 15 serving as gas passages and carries at its lower end the gas valve 17 formed as a ball adapted to close a bore 16 in the interior of the valve cone 7. In the valve cone 7 as a prolongation of this bore 16 a small gas tube 18 having a preferably central opening 40 is fastened with a thread, said small gas tube projects into the neck of the bottle 51 (see Figs. 2–9) and carries a screen 20 for deflecting the liquid.

Into the centering mouth piece 3, which is mounted for movement in a vertical longitudinal direction by means of only partly indicated guiding rods 50 or other means, a rubber gasket 21 is inserted. The rubber gasket 21 at its upper side contacts with a cone surface 48 a corresponding cone surface of the valve housing 1 encompassing the outlet 5 and at its lower side contacts with a cone surface 49 the mouth of the bottle 51. An opening 47 is laterally arranged at the valve housing 1, said opening discharging into a pressure relief valve, which is generally indicated at 22 and mounted on the housing 1.

A bottle 51 (see Figs. 2–9) is pressed to the filling valve 19 by means of a lifting device 24 and the flared centering mouth piece 3.

The valve head piece 2 of the filling valve 19 is fixed to the bottom 31 of the supply vessel in a way not shown in detail. Bottom 31 and cover 32 are connected to one another by a side wall 34 the upper end of which terminates in an external ring 33. The cover 32 is fastened to the external ring 33 by means of screws 35.

In a known way the base of the supply vessel has an annular shape, and the vessel rotates slowly around a center post (not shown). A plurality of filling taps 19 are equidistantly distributed around the circumference of this supply vessel. The liquid level within the supply vessel is indicated at 36. In any suitable way, e.g. by means of a float (not shown), the liquid level is maintained at constant height. The space above the liquid level is filled in a known way with pressurized air or pressurized gas, especially gaseous carbon dioxide. The means for supplying the liquid and the pressure air respectively the pressure gas are not shown in detail, since they are known and do not belong to the invention. The lever 23 of the control device 14 is designed as a fork, the two prongs of which encompass the rod 12 between the two disks 13. A hub (not shown) of the lever 23 is mounted on a shaft 38 which extends with a close fit through the external ring 33 of the supply vessel by means of a jacket 46. At the outer end of the shaft 38 is a two-armed lever 41 by means of which this shaft and thus the lever 23 are pivoted to and fro. The mode of actuation of the two-armed lever 41 is not shown in detail, because it does not belong to the invention. Actuation of lever 41 could be accomplished by abutment and cam means relative to which lever 41 moves during rotation of the supply vessel.

The pressure relief valve 22 is provided with a complex housing having an axially displaceable valve body, in which a roll 43 is rotatably mounted. A stationary camming path indicated at 56 in Figs. 5 and 6 cooperates with the roll 43 and thus with the valve body in such a way, that the pressure relief valve is opened or closed at the desired intervals. When opening the pressure relief valve 22 the valve body is lifted from a seat against the resistance of a spring.

Further the valve head-piece 2 is provided with transverse passages 44, which through a small annular gap 45 communicate with the lower part of the interior of the supply vessel, in order to allow an emptying of the supply vessel with built-in-filling taps.

At the rear of the racking machine a spraying and washing device 25 is arranged with branch conduits 52, 53, 54 and 55 for rinsing the filling valve 19, the flared centering mouth piece 3 and the lifting device 24. A similar spraying and washing device with branch conduits 57, 58 is disposed at the front end between inlet and outlet passages of the bottles to the filling machine. Immediately adjacent this spraying and washing device 26, a receiving container 37 with drain passage 42 is arranged for receiving the liquid which is sprayed out of the gas tube 18 (see Fig. 7 below).

During the racking operation the gas valve is first opened by lifting the ball 17 by means of the control device 14 arranged in the external ring of the vessel. Thus pressure gas especially pressurized $CO_2$ enters the bottle 51. As soon as the pressure is equalized, the interior pressure in the vessel, which up to now acted upon the liquid valve 7, is relieved, so that this valve opens by being lifted under the influence of the helical spring 8. Now the liquid flows through flow passages 52 of the valve head-piece 2, through the seat 4 of the liquid valve and through the narrow wire braid 6 into the outlet 5. From here the liquid flows over the screen 20 arranged closely below at the gas tube 18 towards the bottle wall and runs in a very thin veil downwardly to the bottom as seen in Figure 2. When this occurs the gas of the bottle enters the gas tube 18 through the opening 40 and is returned to the vessel through the gas valve comprising the bore 16 and the cone 17.

After the liquid has reached the gas tube 18, it rises therein up to the level 36 of the liquid in the vessel, thus terminating the filling step. The liquid flow is interrupted as soon as the gas still remaining in the bottle neck no longer finds an outlet. The sieve 6 arranged in the upper part of the outlet prevents the gas from entering the liquid passage 5 and through this the gas chamber of the vessel. With the liquid valve being open the gas leaving the bottle would pass through the liquid and enter into the gas chamber of the vessel in the form of large bubbles. The screen breaks up the rising gas flow into many small bubbles. The upward forces of these small bubbles is so weak that they cannot overcome the surface stress of the liquid. As a result, the liquid and the gas are separated at the screen without the gas being able to enter into the liquid. After the gas valve and the liquid valve have been closed as seen in Figure 4 by a mechanical actuation of the control device 14, the relief valve 22 is actuated as seen in Figure 5 and the pressure in the bottle 51 reduced to atmospheric pressure. Simultaneously also the content of the gas tube extending into the bottle neck is relieved of pressure. A liquid discharge, however, may not occur, because by arranging the gas valve within the liquid valve no expansion forces will be freed.

After relieving the bottle atmosphere as shown in Fig. 6, the bottle together with the flared centering mouth piece 3 is removed from the cone surface of the valve housing 1 encompassing the outlet 5. In this operation the pressure relief valve 22 remains open. The flared centering mouth piece 3 is supported by the guide rods 50 and the bottle is lowered by the lifting device 24 so much that it may be removed underneath the filling valve 19. Immediately after this, the pressure relief valve 22 is closed again and the gas tube 18 is blown out from the supply vessel by a brief lifting of the ball 17. This procedure is shown in Fig. 7. The liquid drops leaving the gas tube are received by the receiving container 37 and are carried away through the drain passage 42. Now the lower part of the filling valve 19 and the flared centering mouth piece 3 are sprayed or rinsed as will be seen from Fig. 8, and a new bottle may be attached to the filling valve 19 with the aid of the lifting device 24. The filling operation is carried out in the manner detailed above. If, however, a bottle bursts when exposed to pressure then the rinsing and spraying device 25 situated at the rear of the filler is operated in a way not shown. Suitably warmed water will then be applied in showers from the branch conduits 52, 53, 54 and 55 to the lower parts of the filling valve 19 including the gas tube 18, the flared centering mouth piece 3 and the lifting device 24, whereby these parts are cleared from all alien matter as for instance small glass pieces, froth remainders and the like. This is shown in Fig. 3 of the drawing.

The filler for hot racking thus provides two stationary rinsing and spraying devices 25, 26. The front one 26 which is smaller is arranged immediately adjacent the spraying place for the gas tube (see Fig. 7), in that place where no filling valves are charged with bottles. The blowing out device 37—42 and the rinsing and spraying device 26 are thus situated between the entrance or feeding place and the exit or delivery place of the bottles. The spraying device 25 is bigger and disposed at the rear of the filling machine. After feeding the bottles to the filling machine, they are first exposed to gas pressure where faulty bottles will burst. It may also happen that bottles still break at the beginning of the filling operation. Then the filling valve will move past the rear spraying device 25 which thus is displaced with regard to the front spraying device 26 by 180°. Between this spraying device 25 and the place where the filled bottles are removed and the gas tube is sprayed out (Fig. 7) the good bottles will be filled and after filling will be relieved from pressure. During the initial rotation of the supply vessel of likewise 180° the bottles are exposed to pressure and are partly filled as explained above.

The measures and devices according to the invention ensure a safe and smooth racking operation. Losses are kept to a minimum.

What we claim is,

1. A method of filling containers with hot carbon dioxide-containing beverages which have been heated to a pasteurizing temperature and pressurized to about the saturation pressure corresponding to said temperature, comprising the steps of conducting said pressurized carbon dioxide-containing beverage while still hot to a counter-pressure filling element, tightly connecting the opening of said container to the outlet opening of said filling element, filling said container by introducing said hot beverage while still pressurized from said filling element to said container, relieving the pressure from said container while still connected to said filling element, removing said container from said filling element, and closing said container.

2. A method of filling containers with hot carbon dioxide-containing beverages which have been heated to a pasteurizing temperature and pressurized to about the saturation pressure corresponding to said temperature, comprising the steps of conducting said pressurized carbon dioxide-containing beverage while still hot to a counter-pressure filling element, tightly connecting the opening of said container to the outlet opening of said filling element, filling said container by introducing said hot beverage while still pressurized from said filling element to said container, gradually relieving the pressure from said container while still connected to said filling element, removing said container from said filling element, and closing and sealing said container.

3. A method of filling containers with hot carbon dioxide-containing beverages which have been heated to a pasteurizing temperature and pressurized to about the saturation pressure corresponding to said temperature, comprising the steps of conducting said pressurized carbon dioxide-containing beverage while still hot to a counter-pressure filling element, tightly connecting the opening of a first of said containers to the outlet opening of said filling element, filling said first container by introducing said hot beverage while still pressurized from said filling element to said container, relieving the pressure from said first container while still connected to said filling element, removing said first container from said filling element, closing and sealing said first container, and spraying said outlet opening of the filling element with hot water before tightly connecting the opening of a second of said containers to the outlet opening of said filling element.

4. A method of filling containers with hot carbon dioxide-containing beverages which have been heated to a pasteurizing temperature and pressurized to about the saturation pressure corresponding to said temperature, comprising the steps of conducting said pressurized carbon dioxide-containing beverage while still hot to a counter-pressure filling element combined with a downwardly facing outlet opening and a vertically movable and guided centering mouthpiece, moving a first of said containers upwards by urging the circumferential edge of the opening of said first container against said centering mouthpiece, tightly connecting the opening of said first container to the outlet opening of said filling element by urging said centering mouthpiece against the circumferential edge of said outlet opening by means of said first container, filling said first container by introducing said hot beverage while still pressurized from said filling element to said container, relieving the pressure from said first container while still connected to said filling element, removing said first container from said filling element, closing said first container, and spraying said outlet opening of the filling element and said centering mouthpiece with hot water before tightly connecting the opening of one second of said containers to the outlet opening of said filling element.

5. A method of filling containers with hot carbon dioxide-containing beverages which have been heated to a pasteurizing temperature and pressurized to about the saturation pressure corresponding to said temperature, comprising the steps of conducting said pressurized carbon dioxide-containing beverage while still hot to a counter-pressure filling element having a downwardly facing outlet opening, with a circular cross-section, tightly connecting the opening of said container to the outlet opening of said filling element, filling said container by introducing said hot beverage while still pressurized in a circular, conically spreading jet from said filling element to said container, relieving the pressure from said container while still connected to said filling element, removing said container from said filling element, and closing said container.

References Cited in the file of this patent

UNITED STATES PATENTS

| | | |
|---|---|---|
| 2,167,123 | Meyer | July 25, 1939 |
| 2,467,684 | Meyer et al. | Apr. 19, 1949 |
| 2,695,743 | Wetherby-Williams | Nov. 30, 1954 |

FOREIGN PATENTS

| | | |
|---|---|---|
| 1,000,709 | Germany | Jan. 10, 1957 |